United States Patent
Lee et al.

(10) Patent No.: US 10,674,393 B2
(45) Date of Patent: Jun. 2, 2020

(54) METHOD AND APPARATUS FOR PERFORMING APPLICATION SPECIFIC CONGESTION CONTROL FOR DATA COMMUNICATION IN WIRELESS COMMUNICATION SYSTEM

(71) Applicant: LG ELECTRONICS INC., Seoul (KR)

(72) Inventors: Youngdae Lee, Seoul (KR); Sunghoon Jung, Seoul (KR); Jaehyun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/760,937

(22) PCT Filed: Sep. 23, 2016

(86) PCT No.: PCT/KR2016/010628
§ 371 (c)(1),
(2) Date: Mar. 16, 2018

(87) PCT Pub. No.: WO2017/052253
PCT Pub. Date: Mar. 30, 2017

(65) Prior Publication Data
US 2018/0288649 A1  Oct. 4, 2018

Related U.S. Application Data

(60) Provisional application No. 62/246,673, filed on Oct. 27, 2015, provisional application No. 62/232,456, (Continued)

(51) Int. Cl.
*H04W 28/02* (2009.01)
*H04W 28/12* (2009.01)
(Continued)

(52) U.S. Cl.
CPC ..... *H04W 28/0289* (2013.01); *H04L 47/2475* (2013.01); *H04W 28/0273* (2013.01);
(Continued)

(58) Field of Classification Search
CPC ... H04W 48/06; H04W 48/10; H04W 84/042; H04W 92/20; H04L 47/2475
(Continued)

(56) References Cited

U.S. PATENT DOCUMENTS 10,212,578 B2 *  2/2019  Siow .................... H04L 65/607
2014/0029530 A1  1/2014  Kim et al.
(Continued)

OTHER PUBLICATIONS

Intel Corporation, "Considerations on signalling of ACDC barring information", R2-153255, 3GPP TSG-RAN WG2 Meeting #91, Beijing, China, Aug. 24-28, 2015, 8 sheets.
(Continued)

*Primary Examiner* — Candal Elpenord
(74) *Attorney, Agent, or Firm* — Birch, Stewart, Kolasch & Birch, LLP

(57) ABSTRACT

A method and apparatus for performing application specific congestion control for data communication (ACDC) in a wireless communication system is provided. A radio resource control (RRC) layer of a user equipment (UE) receives ACDC barring information for a plurality of ACDC categories via system information from a network, determines whether the ACDC barring information for the plurality of ACDC categories contains ACDC barring information for a specific ACDC category selected by upper layers, and if it is determined that the ACDC barring information for the plurality of ACDC categories does not contain ACDC barring information for a specific ACDC category selected by upper layers, performs ACDC barring check by using
(Continued)

ACDC barring information for last ACDC category among the plurality of ACDC categories.

15 Claims, 5 Drawing Sheets

Related U.S. Application Data filed on Sep. 25, 2015, provisional application No. 62/222,748, filed on Sep. 23, 2015.

(51) Int. Cl.
    *H04L 12/859*     (2013.01)
    *H04W 48/06*     (2009.01)
    *H04W 92/20*     (2009.01)
    *H04W 84/04*     (2009.01)

(52) U.S. Cl.
    CPC ........... *H04W 28/12* (2013.01); *H04W 48/06* (2013.01); *H04W 84/042* (2013.01); *H04W 92/20* (2013.01)

(58) Field of Classification Search
    USPC .................................................. 370/328–330
    See application file for complete search history.

(56) References Cited

U.S. PATENT DOCUMENTS

| | | |
|---|---|---|
| 2015/0215845 A1 | 7/2015 | Pinheiro et al. |
| 2016/0262068 A1* | 9/2016 | Won ................... H04W 36/0011 |
| 2016/0330648 A1* | 11/2016 | Hwang ................. H04W 48/02 |
| 2016/0353356 A1* | 12/2016 | Payyappilly .......... H04W 48/06 |
| 2017/0012882 A1* | 1/2017 | Tsai ....................... H04W 48/20 |
| 2018/0027479 A1* | 1/2018 | Ahmad ................. H04W 48/06 370/235 |
| 2018/0359681 A1* | 12/2018 | Futaki ................... H04W 48/10 |
| 2019/0357119 A1* | 11/2019 | Hong ..................... H04L 1/1614 |

OTHER PUBLICATIONS

LG Electronics, et al., "Handling of uncategorized ACDC applications", S1-152405, 3GPP TSG-SA WG1 Meeting #71, Belgrade, Serbia, Aug. 17-21, 2015, 5 pgs.

NEC, "ACDC Category handling", R2-153455, 3GPP TSG-RAN2 Meeting #91, Beijing, China, Aug. 24-28, 2015, 6 pgs.

* cited by examiner

[Fig. 1]
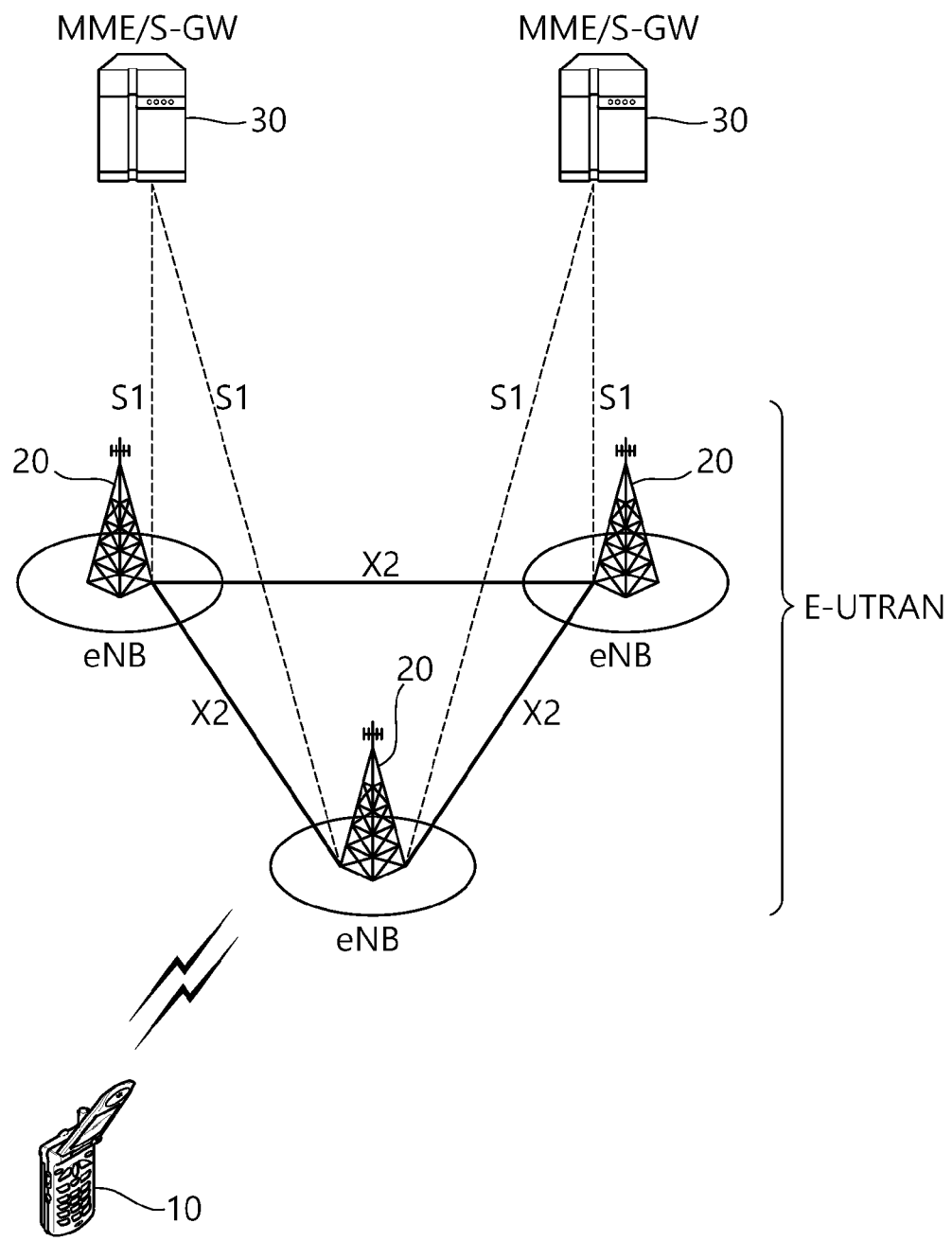

[Fig. 2]
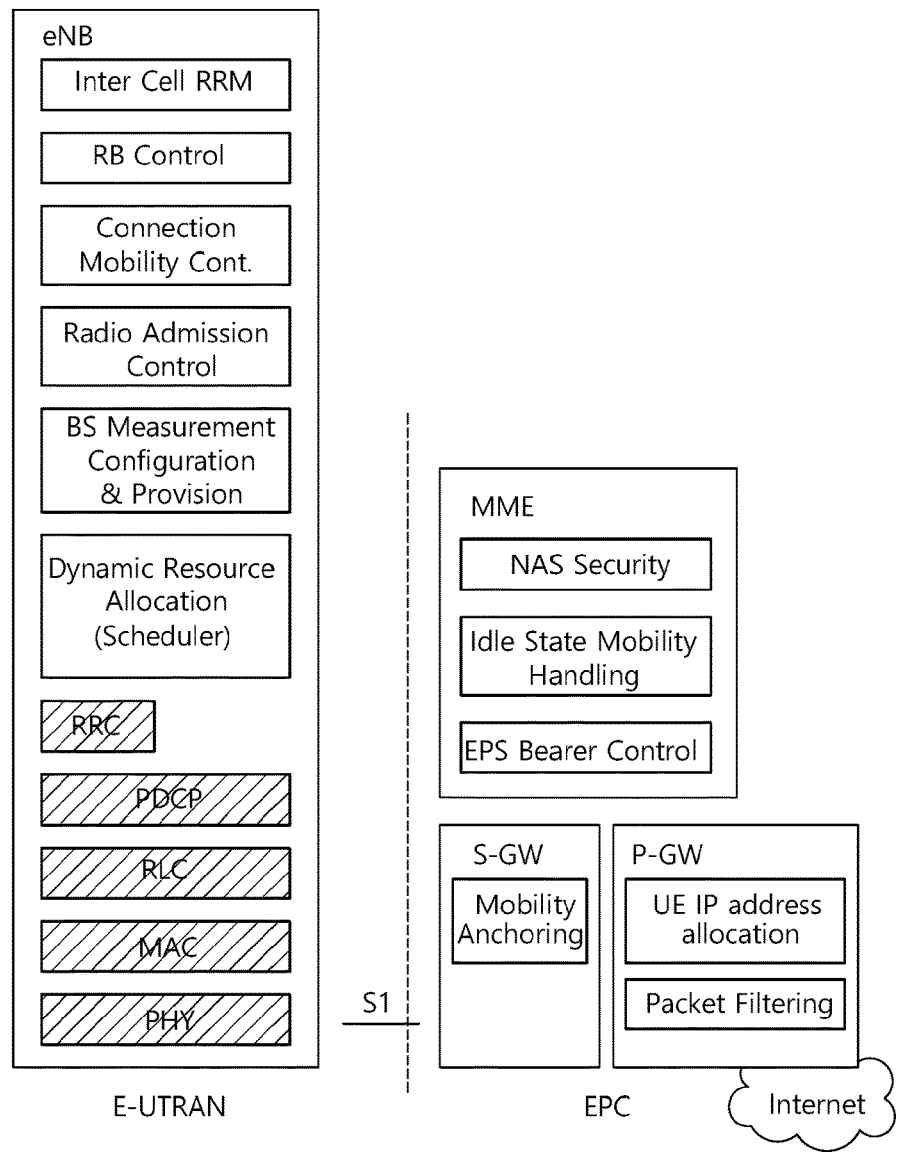
[Fig. 3]
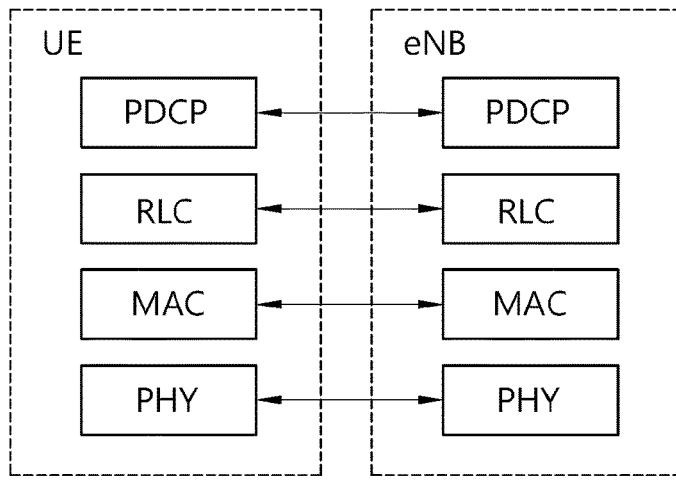

[Fig. 4]
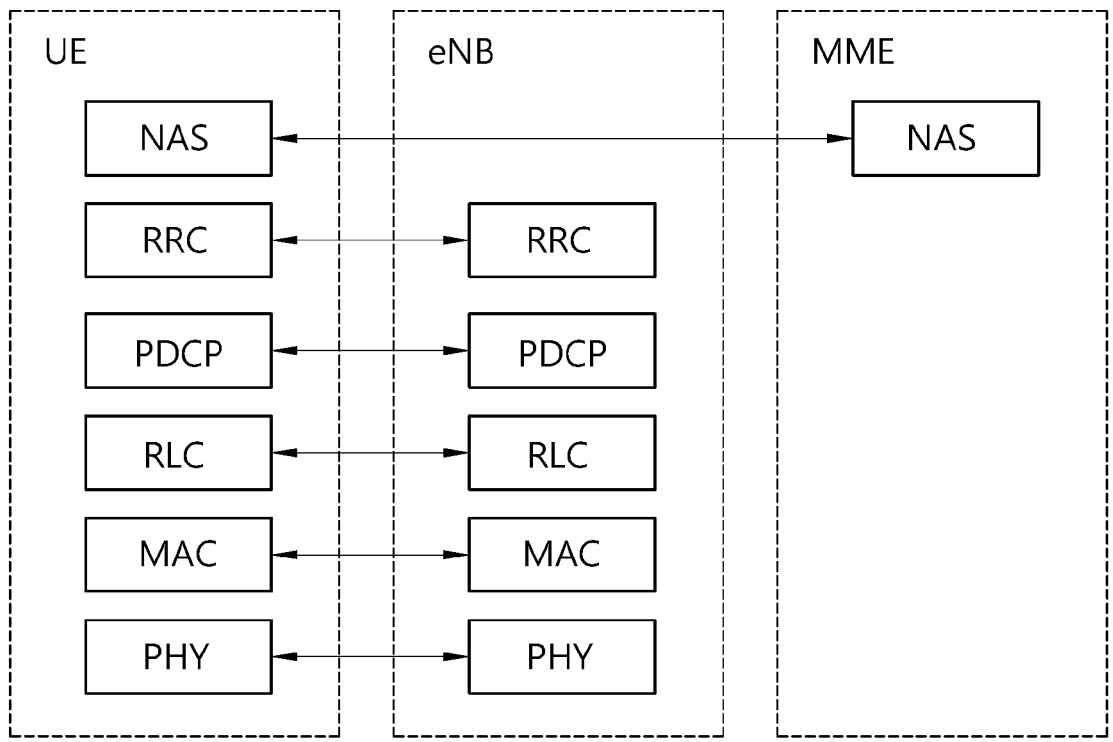
[Fig. 5]
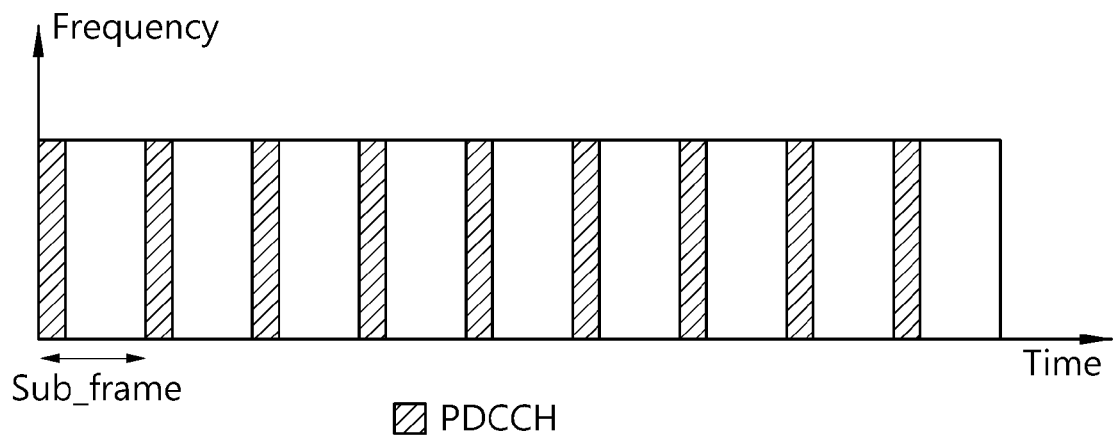

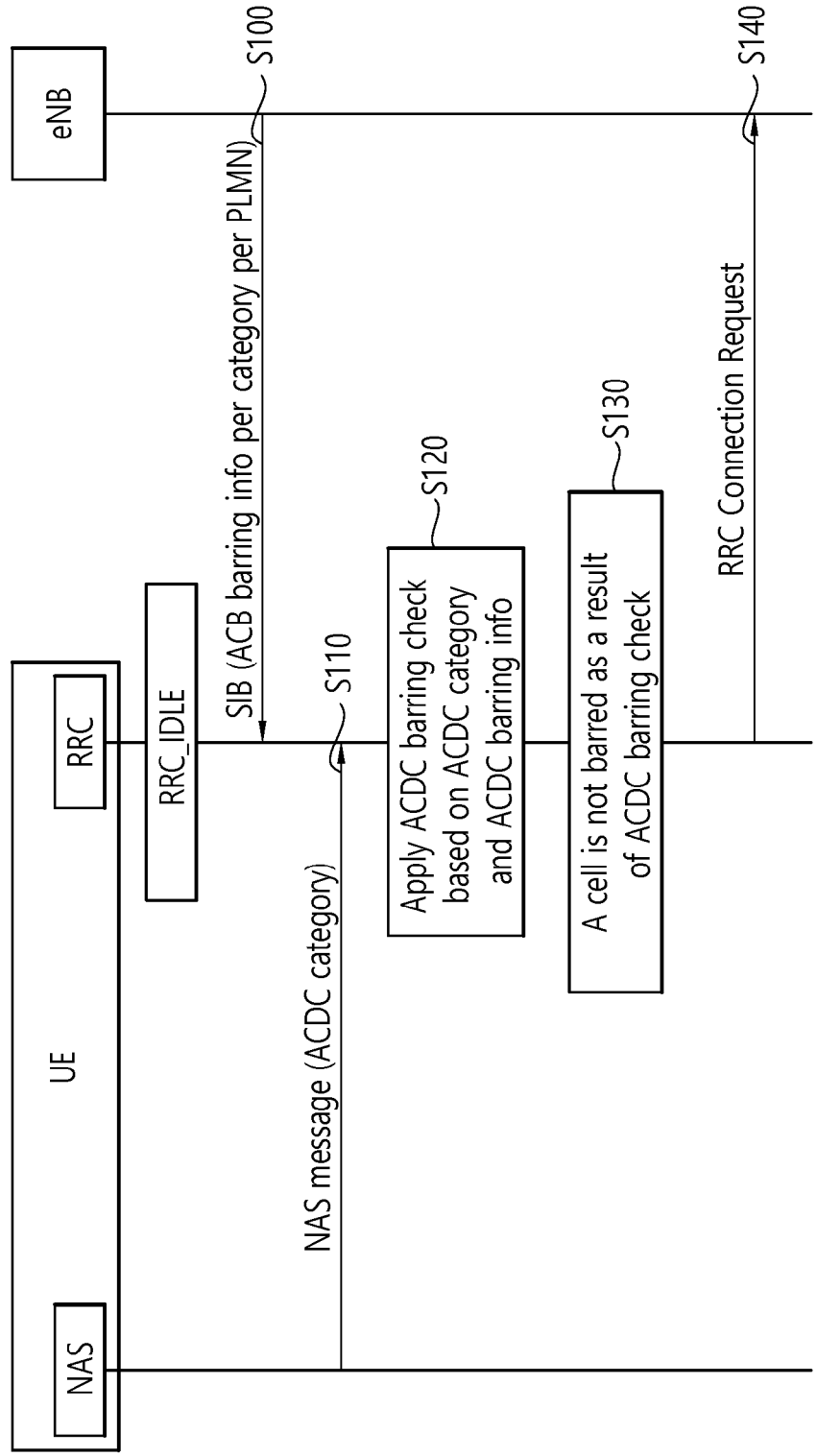
[Fig. 6]

[Fig. 7]
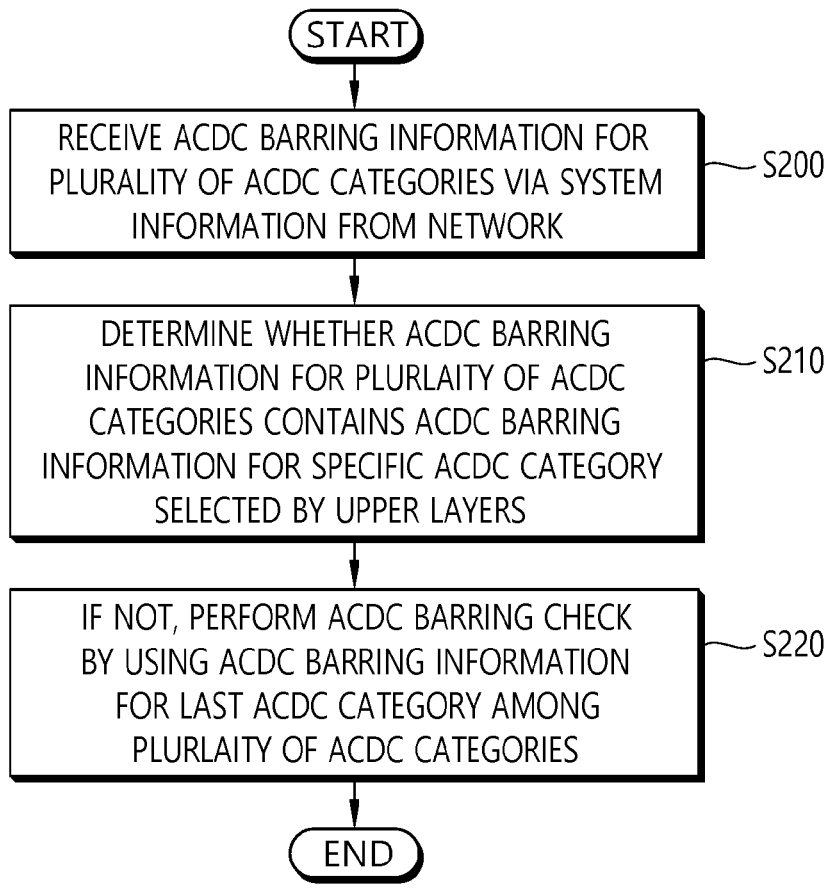
[Fig. 8]
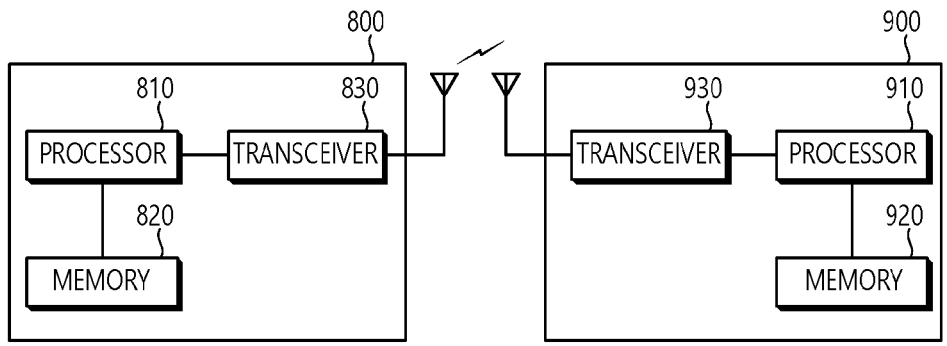

METHOD AND APPARATUS FOR PERFORMING APPLICATION SPECIFIC CONGESTION CONTROL FOR DATA COMMUNICATION IN WIRELESS COMMUNICATION SYSTEM

CROSS REFERENCE TO RELATED APPLICATIONS

This application is the National Phase of PCT International Application No. PCT/KR2016/010628, filed on Sep. 23, 2016, which claims priority under 35 U.S.C. 119(e) to U.S. Provisional Application No. 62/222,748, filed on Sep. 23, 2015, No. 62/232,456, filed on Sep. 25, 2015 and No. 62/246,673, filed on Oct. 27, 2015, all of which are hereby expressly incorporated by reference into the present application.

TECHNICAL FIELD

The present invention relates to wireless communications, and more particularly, to a method and apparatus for performing application specific congestion control for data communication (ACDC) in a wireless communication system.

BACKGROUND ART

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Under certain circumstances, it will be desirable to prevent user equipments (UEs) from making access attempts (including emergency call attempts) or responding to pages in specified areas of a public land mobile network (PLMN). Such situations may arise during states of emergency, or where 1 of 2 or more co-located PLMNs has failed. Broadcast messages should be available on a cell by cell basis indicating the class(es) or categories of subscribers barred from network access. The use of these facilities allows the network operator to prevent overload of the access channel under critical conditions. It is not intended that access control be used under normal operating conditions. It should be possible to differentiate access control between circuit-switched (CS) and packet-switched (PS) domains.

Currently, various access control mechanisms, including access class barring (ACB), service specific access control (SSAC), extended access barring (EAB), are being used for access control in 3GPP LTE. Meanwhile, a need for performing application-based access control has been increased lately. Accordingly, an efficient method for performing application specific congestion control for data communication (ACDC) may be required.

DISCLOSURE OF INVENTION

Technical Problem

The present invention provides a method and apparatus for performing application specific congestion control for data communication (ACDC) in a wireless communication system. The present invention provides a method and apparatus for signaling optimization for broadcast of ACDC information. The present invention further provides interaction with non-access stratum (NAS) layer for ACDC. The present invention further provides user equipment (UE) behavior for ACDC.

Solution to Problem

In an aspect, a method for performing application specific congestion control for data communication (ACDC) by a user equipment (UE) in a wireless communication system is provided. The method includes receiving, by a radio resource control (RRC) layer of the UE, ACDC barring information for a plurality of ACDC categories via system information from a network, determining, by the RRC layer of the UE, whether the ACDC barring information for the plurality of ACDC categories contains ACDC barring information for a specific ACDC category selected by upper layers, and if it is determined that the ACDC barring information for the plurality of ACDC categories does not contain ACDC barring information for a specific ACDC category selected by upper layers, performing, by the RRC layer of the UE, ACDC barring check by using ACDC barring information for last ACDC category among the plurality of ACDC categories.

The ACDC barring information for a plurality of ACDC categories may be ordered by an increasing order of the plurality of ACDC categories. A first entry of the ACDC barring information of the plurality of ACDC categories may correspond to a highest ACDC category of which applications are least restricted in access attempts, and a last entry of the ACDC barring information of the plurality of ACDC categories may correspond to a lowest ACDC category of which applications are most restricted in access attempts.

The ACDC barring information for each of the plurality of ACDC categories may include an ACDC barring factor and ACDC barring time. The ACDC barring information for the plurality of ACDC categories may be configured per public land mobile network (PLMN). The system information may correspond to a system information block type 2 (SIB2).

The method may further include receiving, by the RRC layer of the UE, a non-access stratum (NAS) message including the specific ACDC category from a NAS layer of the UE. The method may further include informing, by the RRC layer of the UE, a NAS layer of the UE that the access barring is applicable due to ACDC, when access is barred as a result of the ACDC barring check.

In another aspect, a user equipment (UE) in a wireless communication system is provided. The UE includes a memory, a transceiver, and a processor, coupled to the memory and the transceiver, that controls the transceiver to receive application specific congestion control for data communication (ACDC) barring information for a plurality of ACDC categories via system information from a network, determines whether the ACDC barring information for the plurality of ACDC categories contains ACDC barring information for a specific ACDC category selected by upper layers, and if it is determined that the ACDC barring information for the plurality of ACDC categories does not contain ACDC barring information for a specific ACDC category selected by upper layers, performs ACDC barring check by using ACDC barring information for last ACDC category among the plurality of ACDC categories.

Advantageous Effects of Invention

ACDC can be performed efficiently.

BRIEF DESCRIPTION OF DRAWINGS

FIG. 1 shows LTE system architecture.

FIG. 2 shows a block diagram of architecture of a typical E-UTRAN and a typical EPC.

FIG. 3 shows a block diagram of a user plane protocol stack of an LTE system.

FIG. 4 shows a block diagram of a control plane protocol stack of an LTE system.

FIG. 5 shows an example of a physical channel structure.

FIG. 6 shows a method for performing ACDC according to an embodiment of the present invention.

FIG. 7 shows a method for performing ACDC according to another embodiment of the present invention.

FIG. 8 shows a wireless communication system to implement an embodiment of the present invention.

MODE FOR THE INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink LTE-advance (LTE-A) is an evolution of the 3GPP LTE.

For clarity, the following description will focus on the LTE-A. However, technical features of the present invention are not limited thereto.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a system architecture evolution (SAE) gateway (S-GW). The MME/S-GW 30 may be positioned at the end of the network and connected to an external network. For clarity, MME/S-GW 30 will be referred to herein simply as a "gateway," but it is understood that this entity includes both the MME and S-GW.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an S1 interface.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e., between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or Ipv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARM). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

FIG. 5 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, an uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Hereinafter, a method for performing application specific congestion control for data communication (ACDC) according to embodiments of the present invention is proposed. ACDC is an access control mechanism for the operator to allow/prevent new access attempts from particular, operator-identified applications in the UE in idle mode. ACDC may not apply to UEs in connected mode. The network may prevent/mitigate overload of the access network and/or the core network.

Generally, the following requirements may apply for ACDC according to an embodiment of the present invention.

ACDC may be applicable to UTRAN and E-UTRAN.

ACDC may be applicable to UEs in idle mode only at are not a member of one or more of access classes 11 to 15.

The home network may be able to configure a UE with at least four ACDC categories to each of which particular, operator-identified applications are associated.

The serving network may be able to broadcast, in one or more areas of the radio access network (RAN), control information, indicating barring information per each ACDC category, and whether a roaming UE shall be subject to ACDC control.

The UE may be able to control whether or not an access attempt for a certain application is allowed, based on this broadcast barring information and the configuration of ACDC categories in the UE.

The serving network may be able to simultaneously indicate ACDC with other forms of access control. When both ACDC and access class barring (ACB) controls are indicated, ACDC may override ACB.

In the case of multiple core networks sharing the same access network, the access network may be able to apply ACDC for the different core networks individually. For the mitigation of congestion in a shared RAN, barring rates may be set equal for all participating operators.

The ACDC categories may be ordered as follows. When configuring the UE with categories of applications, the home network may proceed as follows.

Applications whose use is expected to be restricted the least may be assigned the highest ACDC category; and Applications whose use is expected to be restricted more than applications in the highest category may be assigned the second-to-highest ACDC category, and so on; and Applications whose use is expected to be restricted the most may either be assigned the lowest ACDC category, or not be categorized at all.

FIG. 6 shows a method for performing ACDC according to an embodiment of the present invention. Currently, the UE is in RRC_IDLE.

In step S100, the eNB broadcasts system information block (i.e. SIB2) including a list of ACDC barring information per PLMN per ACDC category to the RRC layer of the UE. That is, the ACDC barring information may be configured per PLMN for a plurality of PLMNs, and in each PLMN, the ACDC barring information may be configured per ACDC category for a plurality of ACDC categories. Since SIB2 is used to broadcast the ACDC barring information, the ACDC barring information may be updated with normal SIB update.

The ACDC barring information for each ACDC category may contain a set of specific parameters. For example, the ACDC barring information may contain ACDC barring factor and ACDC barring time. Or, the ACDC barring information may contain a bitmap where 1 bit per access class is encoded.

The ACDC barring information for each ACDC category may be listed according to an increasing order or decreasing order of the plurality of ACDC categories. In the increasing order, the ACDC barring information for higher ACDC category may be listed in advance than the ACDC barring information for lower ACDC category. That is, the ACDC barring information for the highest ACDC category may be listed at the first entry, the ACDC barring information for the second highest ACDC category may be listed at the second entry . . . while the ACDC barring information for the lowest ACDC category may be listed at the last entry. When applying ACDC, the serving network may broadcast ACDC barring information starting from the highest to the lowest ACDC category.

Alternatively, in the decreasing order, the ACDC barring information for lower ACDC category may be listed in advance than the ACDC barring information for higher ACDC category. That is, the ACDC barring information for the lowest ACDC category may be listed at the first entry, the ACDC barring information for the second lowest ACDC category may be listed at the second entry . . . while the ACDC barring information for the highest ACDC category may be listed at the last entry. When applying ACDC, the serving network may broadcast ACDC barring information starting from the lowest to the highest ACDC category.

In addition, the system information block including the list of ACDC barring information per PLMN per ACDC category may additionally include the maximum number of ACDC category among the listed ACDC categories at the cell or the number of the lowest ACDC category among the listed ACDC categories at the cell.

Further, considering that the ACDC barring information is broadcast per PLMN per ACDC category in system information, optimization of the ACDC barring information may be considered. If multiple PLMNs and multiple ACDC categories are supported at a cell, signaling overhead for ACDC barring information in system information may increase. For one aspect, the ACDC barring information may be broadcast only when congestion occurs. The eNB may not broadcast the ACDC barring information at non-congested cells. Moreover, even in the congested cells, all of ACDC categories may not be barred. That is, it is likely that only a few of lower ACDC categories are barred while higher ACDC categories are not barred.

Accordingly, the ACDC barring information may be optional parameters. That is, the ACDC barring information for a specific ACDC category may be omitted, so that the eNB can avoid broadcasting the ACDC barring information for a specific ACDC category of which access attempts are not to be barred.

In addition, more aggressive signaling optimization may be possible for broadcast of the ACDC barring information. For example, some ACDC categories may have the same ACDC barring information. Table 1 shows an example of ACDC barring information.

TABLE 1

Cat1 = {Not present, Not present} = Never barred,Cat2 = {p40, s32}, Cat3 = {p00, s512}Cat4 = {p00, s512} which is equal to Cat3 at a cell In Table 1, ACDC category 3 and ACDC category 4 have the same ACDC barring information, i.e. the same ACDC barring factor and the same ACDC barring time at a cell. Accordingly, ACDC category 4 may refer to ACDC category 3 so that ACDC barring information for ACDC category 4 may be omitted. Table 2 shows an example of signaling optimization of ACDC barring information.

TABLE 2

Cat1 = {Not present, Not present} = Never barred,Cat2 = {p40, s32}, Cat3 = {p00, s512}Cat4 = {Not present, Not present}

Generally, for signaling optimization, the ACDC barring information for ACDC category N may be omitted, which means that the ACDC barring information for ACDC category N is same as the ACDC barring information for next ACDC category. That is, if the set of specific parameters is not contained in the ACDC barring information for a specific ACDC category (except the highest ACDC category), the UE may consider the set of specific parameters for the specific ACDC category as the set of specific parameters for the next ACDC category. The next ACDC category may be listed right above the specific ACDC category in the list of ACDC categories. Or, the next ACDC category may be next to the specific ACDC category in an increasing order of ACDC categories. For example, the ACDC barring information for CDC category N, which is to be omitted, may be same as the ACDC barring information for ACDC category N−1. Alternatively, the ACDC barring information for ACDC category N, which is to be omitted, may be same as the ACDC barring information for ACDC category N+1.

In addition, ACDC category 1, i.e. the highest ACDC category, may not to be barred at all. In this case, the ACDC barring information for ACDC category 1 may not need to be provided. That is, absence of the ACDC barring information for ACDC category 1 may mean 'not barred'. If the set of specific parameters is not contained in the ACDC barring information for the highest ACDC category, the UE may consider that barring is not applicable for the highest ACDC category.

In step S110, the NAS layer of the UE transmits a NAS message including a specific ACDC category to the RRC layer. The specific ACDC category may be selected by the NAS layer. More specifically, if the UE supports ACDC, the NAS layer may determine the ACDC category applicable to the request based on the application identifier received from the upper layers and the configuration information. The NAS layer may indicate to the RRC layer the followings for the purpose of access control, except when the UE is a UE configured to use AC11-15 in selected PLMN or the UE is answering to paging.

the ACDC category that applies to this request if only one ACDC category is applicable;

the highest ranked ACDC category among the ACDC categories that applies to this request if multiple ACDC categories are applicable; or this request is for an uncategorized application if an application identifier received from the upper layers is not mapped to any ACDC category.

The request from the NAS layer may refer to either a request to establish an initial NAS signaling connection or a request to re-establish a NAS signaling connection.

In step S120, the RRC layer of the UE applies ACDC barring check based on the ACDC category selected by the NAS layer and the received ADCD barring information. If the ACDC information for the plurality of ACDC categories contains the ACDC information entry corresponding to the ACDC category selected by the NAS layer, the RRC layer of the UE may select the ACDC information entry corresponding to the ACDC category selected by the NAS layer, and perform ACDC barring check by using the ACDC information entry for the corresponding ACDC category.

For a UE with ACDC categories configured, the applications on the UE that are not assigned to any ACDC category may be treated by the UE as part of the lowest ACDC category broadcast by the serving network. If the operator requires differentiation with respect to these uncategorized applications, the operator should avoid assigning applications to the lowest ACDC category. The home network and the serving network may use different categorization. The serving network may decide if ACDC applies to roaming UEs.

The number of ACDC categories in the UE may not be the same as the number of ACDC categories broadcast by the serving network. This may happen, e.g. when the UE is roaming and the number of categories broadcast by the serving network is different from the home network. Therefore, the following rules may apply. Hereinafter, a matching ACDC category is an ACDC category for which ACDC barring information is broadcast by the serving network and that has the same rank as the rank of a configured ACDC category in the UE. An unmatched ACDC category is either an ACDC category for which ACDC barring information is broadcast by the serving network but with no corresponding ACDC category configured in the UE, or an ACDC category configured in the UE but with no corresponding ACDC barring information broadcast by the serving network.

If the serving network broadcasts more ACDC categories than the UE's configuration, the UE may use ACDC barring information for the matching ACDC category, and may bar uncategorized applications using the ACDC barring information for the lowest ACDC category broadcast by the serving network, and shall ignore ACDC barring information for unmatched categories.

If the serving network broadcasts ACDC barring information for fewer ACDC categories than the UE's configuration, the UE may use ACDC barring information for the matching ACDC category and shall bar other applications using the ACDC barring information for the lowest category broadcast by the serving network.

That is, for the ACDC category configured in the UE but with no corresponding ACDC barring information broadcast at a cell (i.e. unmatched ACDC category), the RRC layer of the UE may perform the ACDC barring check by using the ACDC barring information corresponding to the lowest ACDC category in system information.

In step S130, it is assumed that the cell is not barred as a result of ACDC barring check. Accordingly, in step S140, the RRC layer of the UE transmits an RRC connection request to the eNB.

Meanwhile, when new access attempt subject ACDC occurs while access barring due to ACB is being applicable, new access attempt may proceed to ACDC barring check regardless of ACB barring status. And, when new access attempt subject ACB occurs while access barring due to ACDC is being applicable, new access attempt may not proceed due to ACDC barring status. Accordingly, when the cell is barred as a result of ACDC barring check, whenever access to the cell is barred due to ACDC, it may be required that the RRC layer of the UE informs the NAS layer of the UE that the access barring is applicable due to ACDC.

Further, the UE may simultaneously apply both extended access barring (EAB) and ACDC in RRC connection establishment. The same relationship between EAB and ACB may be applied to ACDC. Namely, the RRC layer of the UE may perform EAB barring check, if configured, and then ACDC barring check. Further, IP Multimedia Subsystem (IMS) based applications subject to service-specific access control (SSAC) may not be associated to an ACDC category.

According to an embodiment of the present invention described above, ACDC barring check may be proceeded as follows.

1> if upper layers indicate that the RRC connection is subject to ACDC:
2> if SystemInformationBlockType2 contains ACDC-BarringPerPLMN-List-r13 and the ACDC-BarringPerPLMN-List-r13 contains an ACDC-BarringPerPLMN-r13 entry with the plmn-IdentityIndex corresponding to the PLMN selected by upper layers:
3> select the ACDC-BarringPerPLMN-r13 entry with the plmn-IdentityIndex corresponding to the PLMN selected by upper layers;
3> in the remainder of this procedure, use the selected ACDC-BarringPerPLMN-r13 entry for ACDC barring check (i.e. presence or absence of access barring parameters in this entry) irrespective of the common access barring parameters included in SystemInformationBlockType2;
2> else:
3> in the remainder of this procedure use the common access barring parameters (i.e. presence or absence of these parameters) included in SystemInformationBlockType2 for ACDC barring check;
2> if SystemInformationBlockType2 contains ac-BarringForACDC-r13:
3> if the ac-BarringForACDC-r13 contains a BarringPerACDC-Category-r13 entry corresponding to the ACDC category selected by upper layers:
4> select the BarringPerACDC-Category-r13 entry corresponding to the ACDC category selected by upper layers;
3> else: (i.e. in case that uncategorized ACDC category is indicated by upper layers, or in case that the ACDC category selected by upper layers is not available in SIB2, i.e. unmatched ACDC category)
4> select the last BarringPerACDC-Category-r13 entry in the BarringPerACDC-CategoryList-r13;
3> if the UE is establishing the RRC connection for mobile originating calls:
4> perform access barring check, using T3xx as "Tbarring" and the BarringPerACDC-Category-r13 as "AC barring parameter";
4> if access to the cell is barred:
5> inform upper layers about the failure to establish the RRC connection and that access barring for mobile originating calls is applicable due to ACDC, upon which the procedure ends;
3> else if the UE is establishing the RRC connection for mobile originating signaling:
4> perform access barring check, using T3yy as "Tbarring" and the BarringPerACDC-Category-r13 as "AC barring parameter";
4> if access to the cell is barred:
5> inform upper layers about the failure to establish the RRC connection and that access barring for mobile originating signalling is applicable due to ACDC, upon which the procedure ends;

Table 3 shows an example of the SystemInformationBlockType2 information element (IE). The SystemInformationBlockType2 IE contains radio resource configuration information that is common for all UEs, specifically the ACDC barring information described above.

TABLE 3

-- ASN1STARTSystemInformationBlockType2 ::= SEQUENCE { ac-BarringInfo SEQUENCE { ac-BarringForEmergency BOOLEAN, ac-BarringForMO-Signalling AC-BarringConfig OPTIONAL, -- Need OP ac-BarringForMO-Data AC-BarringConfig OPTIONAL -- Need OP } OPTIONAL, -- Need OP radioResource-ConfigCommon RadioResourceConfigCommonSIB, ue-TimersAndConstants UE-TimersAndConstants, freqInfo SEQUENCE { ul-CarrierFreq ARFCN-ValueEUTRA OPTIONAL, -- Need OP ul-Bandwidth ENUMERATED {n6, n15, n25, n50, n75, n100} OPTIONAL, -- Need OP additionalSpectrumEmission AdditionalSpectrumEmission }, mbsfn-SubframeConfigList MBSFN-SubframeConfigList OPTIONAL, -- Need OR timeAlignmentTimerCommon TimeAlignmentTimer, ..., lateNonCriticalExtension OCTET STRING (CONTAINING SystemInformation-BlockType2-v8h0-IEs) OPTIONAL, [[ ssac-BarringForMMTEL-Voice-r9 AC-BarringConfig OPTIONAL, -- Need OP ssac-BarringForMMTEL-Video-r9 AC-BarringConfig OPTIONAL -- Need OP ]], [[ ac-BarringForCSFB-r10 AC-BarringConfig OPTIONAL -- Need OP ]], [[ ac-BarringSkipForMMTELVoice-r12 ENUMERATED {true} OPTIONAL, -- Need OP ac-BarringSkipForMMTELVideo-r12 ENUMERATED {true} OPTIONAL, -- Need OP ac-BarringSkipForSMS-r12 ENUMERATED {true} OPTIONAL, -- Need OP ac-BarringPerPLMN-List-r12 AC-BarringPerPLMN-List-r12 OPTIONAL -- Need OP ]], [[ ac-BarringForACDC-r13BarringPerACDC-CategoryList-r13OPTIONAL,-- Need OP ]]}...ACDC-BarringPerPLMN-List-r13 ::= SEQUENCE (SIZE (1..maxPLMN-r11)) OF ACDC-BarringPerPLMN-r13ACDC-BarringPerPLMN-r13 ::=

TABLE 3-continued

```
SEQUENCE {plmn-IdentityIndex-r13INTEGER (1..maxPLMN-r11),ac -
BarringForACDCBarringPerACDC-CategoryList-r13 OPTIONAL,-- Need OP}
BarringPerACDC-CategoryList-r13 ::= SEQUENCE (SIZE (1.. maxACDC-Cat-r13))
OF BarringPerACDC-Category-r13BarringPerACDC-Category-r13 ::= SEQUENCE
{    acdc-BarringConfig-r13        SEQUENCE {       ac- Bar-
ringFactor-r13                     ENUMERATED {
                                            p00, p05, p10, p15, p20, p25,
p30, p40,                                         p50, p60, p70, p75,
p80, p85, p90, p95},         ac-BarringTime-r13
ENUMERATED {s4, s8, s16, s32, s64, s128, s256, s512}
}                                              OPTIONAL}--
ASN1STOP
```

Referring to Table 3, the SystemInformationBlockType2 IE may include BarringPerACDC-CategoryList-r13 IE, which corresponds to a list of the ACDC barring information for a plurality of ACDC categories. The maximum number of the plurality of ACDC categories per PLMN may be 16. In the increasing order, the first ACDC barring information in the list may correspond to the highest ACDC category of which applications are the least restricted in access attempts, the second in the list may correspond to the ACDC category of which applications are restricted more than applications of the highest ACDC category, and so on. The last ACDC barring information in the list may correspond to the lowest ACDC category of which applications are the most restricted in access attempts. Alternatively, in the decreasing order, the first ACDC barring information in the list may correspond to the lowest ACDC category of which applications are the most restricted in access attempts, the second in the list may correspond to the ACDC category of which applications are restricted less than applications of the lowest ACDC category, and so on. The last ACDC barring information in the list may correspond to the highest ACDC category of which applications are the most restricted in access attempts.

The BarringPerACDC-CategoryList-r13 IE may include the acdc-BarringConfig-r13 IE per each ACDC category, which corresponds the ACDC barring information per each ACDC category. This parameter may be optional. If this parameter is absent in the first entry of the barringPer-ACDC-CategoryList-r13 for the highest ACDC category, the value of ac-BarringFactor-r13 of this parameter may be set to 1. If this paremeter is absent in an entry of the barringPerACDC-CategoryList-r13 for an ACDC category, it may be equal to the previous entry of the barringPer-ACDC-CategoryList-r13.

The acdc-BarringConfig-r13 IE may include the ac-BarringFactor-r13 field and the ac-BarringTime-r13 field. The ac-BarringFactor-r13 field are interpreted in the range [0,1]: p00=0, p05=0.05, p10=0.10, ?, p95=0.95. If this parameter is absent for the first ACDC-BarringPerCategory-r13 in the list, this value may be set to 1. If this parameter is absent in the second ACDC-BarringPerCategory-r13, the value in the second may be set to the value of acdc-BarringFactor-r13 in the first ACDC-BarringPerCategory-r13. If this parameter is absent in the NthACDC-BarringPerCategory-r13, the value in the $N^{th}$ may be set to the value of acdc-BarringFactor-r13 in the $(N-1)^{th}$ ACDC-BarringPerCategory-r13. The ac-BarringTime-r13 field mean access barring time value in seconds. If this parameter is absent for the first ACDC-BarringPerCategory-r13 in the list, this value may be set to 0 second. If this parameter is absent in the second ACDC-BarringPerCategory-r13, the value in the second may be set to the value of acdc-BarringTime-r13 in the first A CDC-BarringPerCategory-r13. If this parameter is absent in the NthACDC-BarringPerCategory-r13, the value in the $N^{th}$ may be set to the value of acdc-BarringFactor-r13 in the $(N-1)^{th}$ ACDC-BarringPerCategory-r13.

Further, even though not described in Table 3, the SystemInformationBlockType2 IE may include the acdc-LowestCategory-r13 field. The acdc-LowestCategory-r13 field indicates the number of the lowest ACDC category broadcast at a cell. Value 1 may indicate the highest ACDC category, value 2 may indicate the second highest ACDC category, and so on. If the value is set to N, the ACDC barring information for $N^{th}$ highest ACDC category may be explicitly signaled, any ACDC category above the $N^{th}$ highest ACDC category may not be included in acdc-BarringPerCategoryList-r13, and any ACDC category below the $N^{th}$ highest ACDC category may be omitted in acdc-BarringPerCategoryList-r13. The value of parameters of ACDC-BarringPerCategory-r13 for the omitted $i^{th}$ ACDC category may be set to the value of parameters of ACDC-BarringPerCategory-r13 in the $(i+1)^{th}$ ACDC category.

FIG. 7 shows a method for performing ACDC according to another embodiment of the present invention. The embodiments of the present invention described above may be applied to this embodiment.

In step S200, the RRC layer of the UE receives ACDC barring information for a plurality of ACDC categories via system information from a network. The ACDC barring information for a plurality of ACDC categories may be ordered by an increasing order of the plurality of ACDC categories. That is, a first entry of the ACDC barring information of the plurality of ACDC categories may correspond to a highest ACDC category of which applications are least restricted in access attempts, and a last entry of the ACDC barring information of the plurality of ACDC categories may correspond to a lowest ACDC category of which applications are most restricted in access attempts. Alternatively, the ACDC barring information for a plurality of ACDC categories may be ordered by a decreasing order of the plurality of ACDC categories. That is, a first entry of the ACDC barring information of the plurality of ACDC categories may corresponds to a lowest ACDC category of which applications are most restricted in access attempts, and a last entry of the ACDC barring information of the plurality of ACDC categories may correspond to a highest ACDC category of which applications are least restricted in access attempts. Further, The ACDC barring information for each of the plurality of ACDC categories may include an ACDC barring factor and ACDC barring time. The ACDC barring information for the plurality of ACDC categories may be configured per PLMN. The system information may correspond to SIB2.

The RRC layer of the UE may receive a NAS message including the specific ACDC category from a NAS layer of the UE. In step S210, the RRC layer of the UE determines whether the ACDC barring information for the plurality of ACDC categories contains ACDC barring information for a specific ACDC category selected by upper layers. In step S220, if it is determined that the ACDC barring information for the plurality of ACDC categories does not contain ACDC barring information for a specific ACDC category selected by upper layers, the RRC layer of the UE performs ACDC barring check by using ACDC barring information for last ACDC category among the plurality of ACDC categories. When access is barred as a result of the ACDC barring check, the RRC layer of the UE may inform by a NAS layer of the UE that the access barring is applicable due to ACDC.

FIG. 8 shows a wireless communication system to implement an embodiment of the present invention.

An eNB 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method performed by a wireless device in a wireless communication system, the method comprising:

receiving, from a network, system information comprising barring information for a plurality of application specific congestion control for data communication (ACDC) categories;

identifying barring information for an ACDC category selected by upper layers among the barring information for the plurality of ACDC categories;

performing an access attempt for the ACDC category to a cell, wherein an access to the cell as a result of the access attempt is considered to be allowed for the ACDC category based on that at least one of a barring factor or a barring time is absent in the barring information for the ACDC category; and informing the upper layers of the result of the access attempt.

2. The method of claim 1, wherein the barring information for the plurality of ACDC categories is ordered by an increasing order of the plurality of ACDC categories.

3. The method of claim 1, wherein a first entry of the barring information for the plurality of ACDC categories is mapped to a highest category of which applications are least restricted in access attempts, and wherein a last entry of the barring information for the plurality of ACDC categories is mapped to a lowest category of which applications are most restricted in access attempts.

4. The method of claim 1, wherein a first entry of the barring information for the plurality of ACDC categories is mapped to a lowest ACDC category of which applications are most restricted in access attempts, and wherein a last entry of the barring information for the plurality of ACDC categories is mapped to a highest ACDC category of which applications are least restricted in access attempts.

5. The method of claim 1, wherein the barring information for the plurality of ACDC categories includes a barring factor and barring time for at least one of the plurality of ACDC categories.

6. The method of claim 1, wherein the barring information for the plurality of ACDC categories is configured per public land mobile network (PLMN).

7. The method of claim 1, wherein the barring information for the ACDC category is barring information for a next ACDC category with respect to the ACDC category.

8. The method of claim 1, wherein the system information includes information on a maximum number of ACDC categories among the plurality of ACDC categories.

9. The method of claim 1, wherein the system information includes information on a number of lowest ACDC categories among the plurality of ACDC categories.

10. A wireless device in a wireless communication system, the wireless device comprising:

a memory;

a transceiver; and at least one processor coupled to the memory and the transceiver, wherein the transceiver is configured to receive, from a network, system information comprising barring information for a plurality of application specific congestion control for data communication (ACDC) categories, and wherein the at least one processor is configured to:

identify barring information for an ACDC category selected by upper layers among the barring information for the plurality of ACDC categories, perform an access attempt for the ACDC category to a cell, wherein an access to the cell as a result of the access attempt is considered to be allowed for the ACDC category based on that at least one of a barring factor or a barring time is absent in the barring information for the ACDC category, and inform the upper layers of the result of the access attempt.

11. The wireless device of claim 10, wherein the barring information for the plurality of ACDC categories is ordered by an increasing order of the plurality of ACDC categories.

12. The wireless device of claim 10, wherein a first entry of the barring information for the plurality of ACDC categories is mapped to a highest category of which applications are least restricted in access attempts, and wherein a last entry of the barring information for the plurality of ACDC categories is mapped to a lowest category of which applications are most restricted in access attempts.

13. The wireless device of claim 10, wherein the transceiver is further configured to inform the upper layers of the result of the access attempt.

14. The wireless device of claim 10, wherein a first entry of the barring information for the plurality of ACDC categories is mapped to a lowest ACDC category of which applications are most restricted in access attempts, and wherein a last entry of the barring information for the plurality of ACDC categories is mapped to a highest ACDC category of which applications are least restricted in access attempts.

15. A processor for a wireless device in a wireless communication system, wherein the processor is configured to:

control the wireless device to receive, from a network, system information comprising barring information for a plurality of application specific congestion control for data communication (ACDC) categories;

identify barring information for an ACDC category selected by upper layers among the barring information for the plurality of ACDC categories;

perform an access attempt to a cell based on the ACDC category, wherein an access to the cell as a result of the access attempt is considered to be allowed based on that at least one of a barring factor or a barring time is absent in the barring information for the ACDC category; and inform the upper layers of the result of the access attempt.

* * * * *